(12) United States Patent
Riley et al.

(10) Patent No.: US 8,156,102 B2
(45) Date of Patent: *Apr. 10, 2012

(54) INFERRING SEARCH CATEGORY SYNONYMS

(75) Inventors: Michael D. Riley, New York, NY (US); Zhiyan Liu, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/581,544

(22) Filed: Oct. 19, 2009

(65) Prior Publication Data

US 2010/0036822 A1  Feb. 11, 2010

Related U.S. Application Data

(63) Continuation of application No. 11/283,833, filed on Nov. 22, 2005, now Pat. No. 7,627,548.

(51) Int. Cl.
G06F 7/00 (2006.01)

(52) U.S. Cl. .......... 707/708; 709/217
(58) Field of Classification Search .......... 707/708
See application file for complete search history.

(56) References Cited

U.S. PATENT DOCUMENTS

| 5,502,774 | A | 3/1996 | Bellegarda et al. | |
|---|---|---|---|---|
| 7,162,453 | B1 * | 1/2007 | Tenorio | 705/64 |
| 7,185,088 | B1 * | 2/2007 | Joy et al. | 709/224 |
| 2002/0107852 | A1 * | 8/2002 | Oblinger | 707/5 |
| 2003/0144994 | A1 * | 7/2003 | Wen et al. | 707/3 |
| 2003/0163466 | A1 * | 8/2003 | Rajaraman et al. | 707/6 |
| 2004/0158560 | A1 | 8/2004 | Wen et al. | |
| 2004/0220905 | A1 | 11/2004 | Chen et al. | |
| 2004/0260677 | A1 | 12/2004 | Malpani et al. | |
| 2005/0091198 | A1 | 4/2005 | Dettinger et al. | |
| 2005/0149499 | A1 | 7/2005 | Franz et al. | |

FOREIGN PATENT DOCUMENTS

KR  10-0525618  10/2005

OTHER PUBLICATIONS

M. Riley et al., co-pending U.S. Appl. No. 11/283,833, filed Nov. 22, 2005, entitled "Inferring Search Category Synonyms from User Logs".
International Search Report and Written Opinion dated Oct. 4, 2007, 10 total pages.
International Preliminary Report on Patentability dated May 27, 2008 issued in corresponding PCT Application No. PCT/US2006/061211, 7 pages.
Supplementary European Search Report, corresponding to EP 06 84 8489, mailed Dec. 23, 2009, 8 pages.
Akria Maeda, "Study of Humanities and Natural Language Processing, Automatic Keyword Extraction System 'Gensen (term extraction) Web" Journal of Japan Association for East Asian Text Processing, vol. 6, Kohbun Shuppan, Inc., Oct. 1, 2005, pp. 124-133. (Includes partial English translation).

* cited by examiner

*Primary Examiner* — Fazlul Quader
(74) *Attorney, Agent, or Firm* — Harrity & Harrity, LLP

(57) ABSTRACT

Systems and methods for inferring category synonyms from prior result data may include identifying prior query data including query information and category information relating to the prior result data; determining whether the query information is a synonym for the category information; and using the query information and the category information in subsequent search requests if it is determined that the query information is a synonym for the category information.

24 Claims, 7 Drawing Sheets

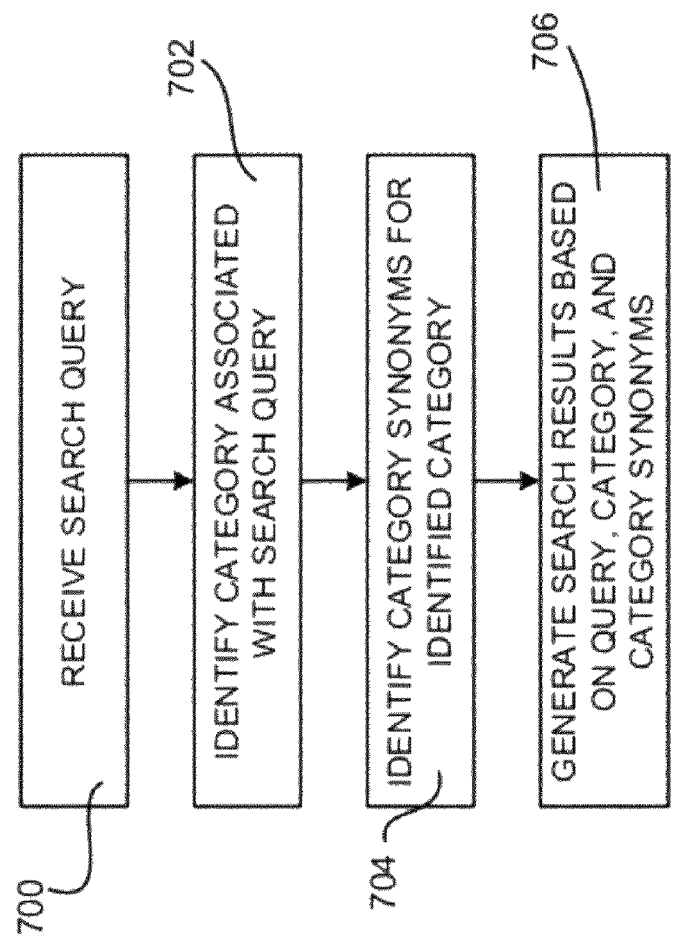

INFERRING SEARCH CATEGORY SYNONYMS

RELATED APPLICATIONS

This application is a continuation of U.S. patent application Ser. No. 11/283,833, filed Nov. 22, 2005, now U.S. Pat. No. 7,627,548 issued Dec. 1, 2009, the entire contents of which is incorporated herein by reference.

FIELD OF THE INVENTION

Implementations consistent with the principles of the invention relate generally to query processing and, more particularly, to providing search query refinements.

BACKGROUND

Although the Internet traces back to the late 1960s, the widespread availability and acceptance of personal computing and internetworking have resulted in the explosive growth and unprecedented advances in information sharing technologies. In particular, the Worldwide Web ("Web") has revolutionized accessibility to untold volumes of information in stored electronic form to a worldwide audience, including written, spoken (audio) and visual (imagery and video) information, both in archived and real-time formats. In short, the Web has provided desktop access to every connected user to a virtually unlimited library of information in almost every language worldwide.

Search engines have evolved in tempo with the increased usage of the Web to enable users to find and retrieve relevant Web content in an efficient and timely manner. As the amount and types of Web content have increased, the sophistication and accuracy of search engines have likewise improved. Generally, search engines strive to provide the highest quality results in response to a search query. However, determining quality is difficult, as the relevance of retrieved Web content is inherently subjective and dependent upon the interests, knowledge and attitudes of the user.

Existing methods used by search engines are based on matching search query terms to terms indexed from Web pages. More advanced methods determine the importance of retrieved Web content using, for example, a hyperlink structure-based analysis.

A typical search query scenario begins with either a natural language question or individual terms, often in the form of keywords, being submitted to a search engine. The search engine executes a search against a data repository describing information characteristics of potentially retrievable Web content and identifies the candidate Web pages. Searches can often return thousands or even millions of results, so most search engines typically rank or score only a subset of the most promising results. The top Web pages are then presented to the user, usually in the form of Web content titles, hyperlinks, and other descriptive information, such as snippets of text taken from the Web pages.

Providing quality search results can be complicated by the literal and implicit scope of the search query itself. A poorly-framed search query could be ambiguous or be too general or specific to yield responsive and high quality search results. For instance, terms within a search query can be ambiguous at a syntactic or semantic level. A syntactic ambiguity can be the result of an inadvertent homonym, which specifies an incorrect word having the same sound and possibly same spelling, but different meaning from the word actually meant. For example, the word "bear" can mean or can refer to an animal or an absence of clothing. A semantic ambiguity can be the result of improper context. For example, the word "jaguar" can refer to an animal, a version of the Macintosh operating system, or a brand of automobile. Similarly, search terms that are too general result in overly broad search results while search terms that are too narrow result in unduly restrictive and non-responsive search results.

Accordingly, there is a need for an approach to providing suggestions for search query refinements that will resolve ambiguities or over generalities or over specificities occurring in properly framed search queries. Preferably, such an approach would provide refined search queries that, when issued, result in search results closely related to the actual topic underlying the intent of the original search query and provide suggestions that reflect conceptual independence and clear meanings as potential search terms.

SUMMARY

In accordance with one implementation consistent with the principles of the invention, a method may include identifying prior query data including at least query information and category information relating to prior result data; determining whether the query information is a synonym for the category information; and using the query information and the category information in subsequent search requests if it is determined that the query information is a synonym for the category information.

In accordance with another implementation consistent with principles of the invention, a system may include means for determining whether query data and category data included within prior search results are category synonyms; and means for incorporating the query data into subsequent search requests associated with the category data if it is determined that the query data and the category data are category synonyms.

In accordance with yet another implementation consistent with principles of the invention, a device may include logic for identifying historical log data including at least one query, category pair associated with a prior search request; logic for determining whether the query in the query, category pair is a name query or a categorical query; and logic for determining whether the query is a synonym of the category when it is determined that the query is a categorical query.

In accordance with still another implementation consistent with principles of the invention, a method may include receiving a search query from a client; identifying a result category based on the received search query; identifying category synonyms for the identified result category; and performing a result search based on the result category and identified category synonyms.

BRIEF DESCRIPTION OF THE DRAWINGS

The accompanying drawings, which are incorporated in and constitute a part of this specification, illustrate an implementation of the invention and, together with the description, explain the invention. In the drawings.

FIG. 7 is a flow chart illustrating exemplary processing for performing a user initiated search in accordance with principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Overview

The quantity of documents becoming searchable via search engines is substantially increasing. Accordingly, search queries which may be submitted to locate relevant documents may more easily suffer from potential ambiguities or generalities. It is beneficial to identify and provide search query refinements which may remedy the initial query deficiencies or which may expand an initial search query to identify additional relevant documents. As described herein, search query refinements may be automatically generated to assist the user in more quickly and more accurately identifying desirable search results. More specifically, searchable information may be assigned to or broken down into various predefined categories. For example, a listing for "Joe's Bar and Grill" may be assigned to both the "bars" and "taverns" categories. In accordance with principles of the invention, category synonyms may be identified from within prior result data to thereby enable enhanced searching of the searchable information. The identified category synonyms may then be used in conjunction with the pre-defined categories in performing a requested search.

Figure 1:
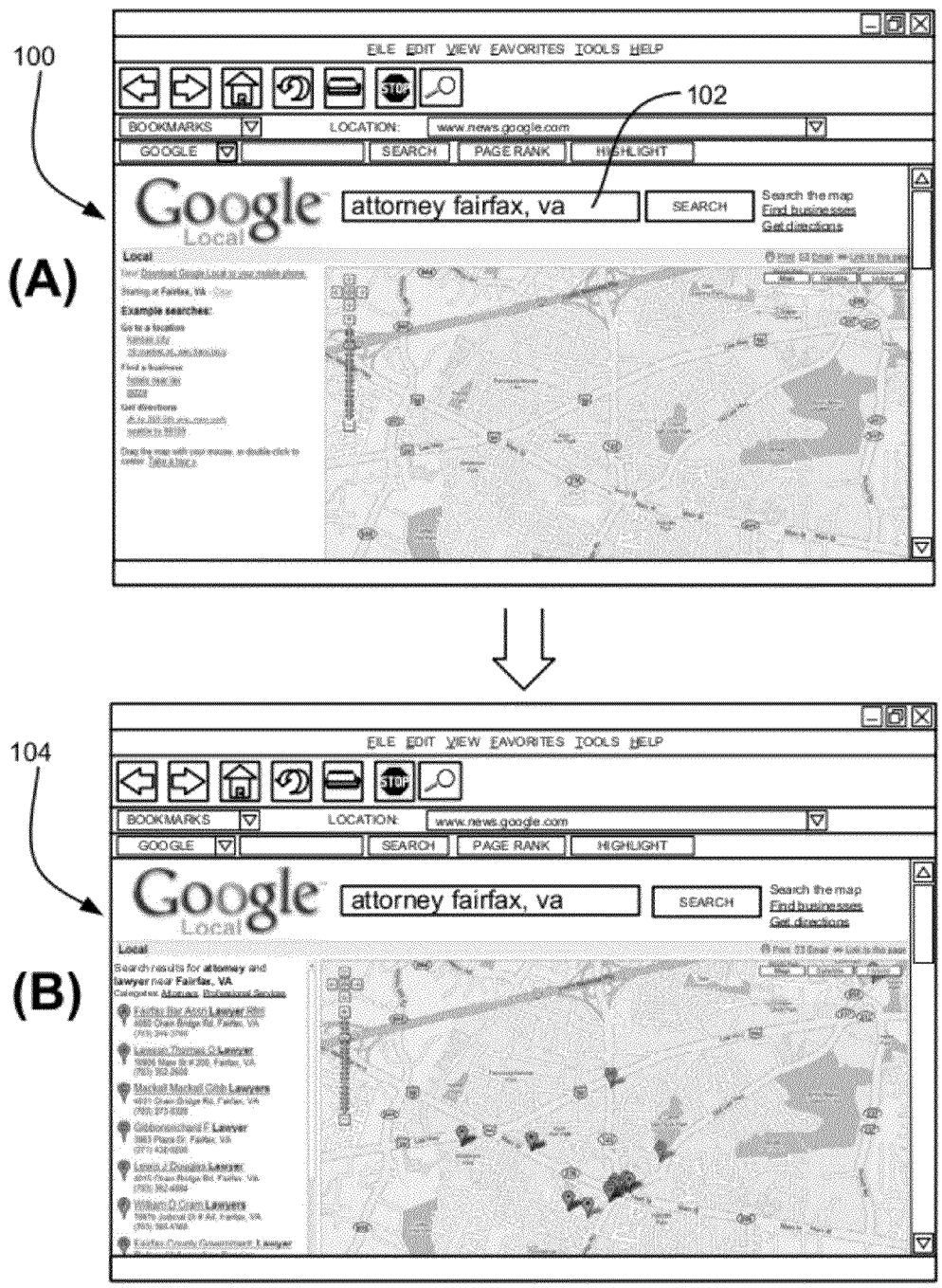
FIG. 1 is an exemplary diagram illustrating a concept consistent with principles of the invention.

FIG. 1 is an exemplary diagram illustrating a concept consistent with principles of the invention. As shown at (A), a user may access a web document, such as a web page 100, using a web browser. As also shown at (A), the web browser includes a search query entry box 102 for receiving an initial search query from a user. In the exemplary implementation, search query entry box 102 may include a phrase such as "attorney Fairfax, Va.", presumably requesting information regarding attorneys in Fairfax, Va.

In accordance with principles of the invention, submission of the entered query may result in a web document, such as web page 104, as shown in (B), that includes search results based on the submitted query as well as identified category synonyms for the query terms. In the exemplary implementation, results may be displayed based on the following modified query: (attorney OR attorneys OR lawyer OR lawyers) AND "Fairfax, Va.". As will be described in additional detail below, synonyms for identified categories applied to a search query may be identified and used in obtaining the provided search results. More specifically, subsequent searches for a received query may be the performed using the query terms, the initially identified category, as well as any subsequently identified category synonyms based on prior good search results. In this manner, increased accuracy and functionality of search results may be obtained.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
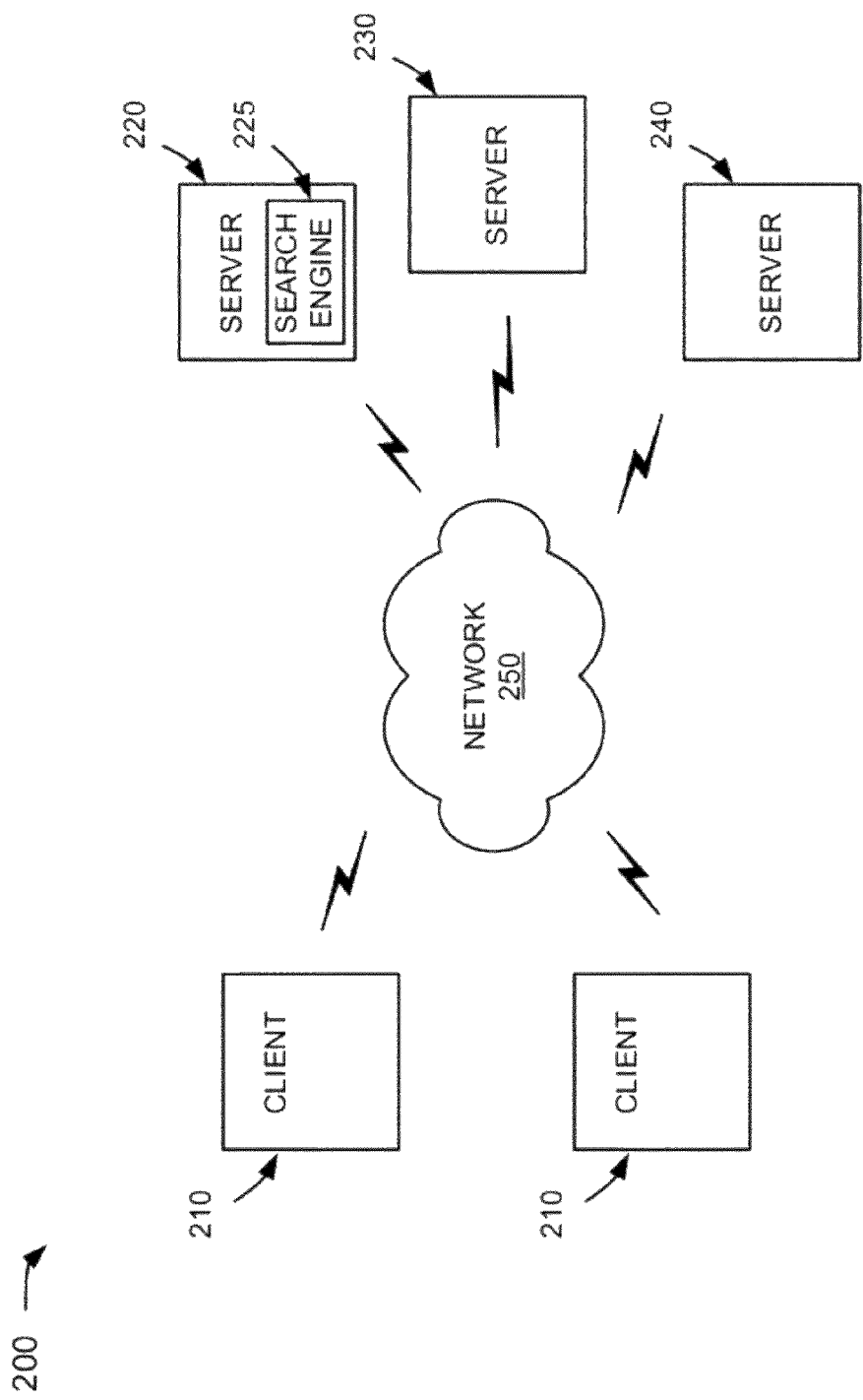
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a laptop, or another type of computation or communication device, a thread or process running on one of these devices, and/or an object executable by one of these devices. Clients 210 may further include browser software configured to operate as a user interface between clients 210 and servers 220-240.

Servers 220-240 may include server entities that gather, process, search, and/or maintain documents or other information in a manner consistent with the principles of the invention. In an implementation consistent with the principles of the invention, server 220 may include a search engine 225 usable by clients 210. Server 220 may crawl a corpus of documents, index the documents, and store information associated with the documents in a repository of documents. Servers 230 and 240 may store or maintain documents that may be crawled or analyzed by server 220. Additionally, servers 220-240 may also maintain one or more logs relating to the transmission of documents or information to clients 210. In one implementation consistent with principles of the invention, such logs may include information relating to what documents or information were transmitted to clients 210 in response to received user queries or requests. Moreover, additional information may be logged including actions taken by clients 210 in response to transmission of the documents or information from servers 220-240.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
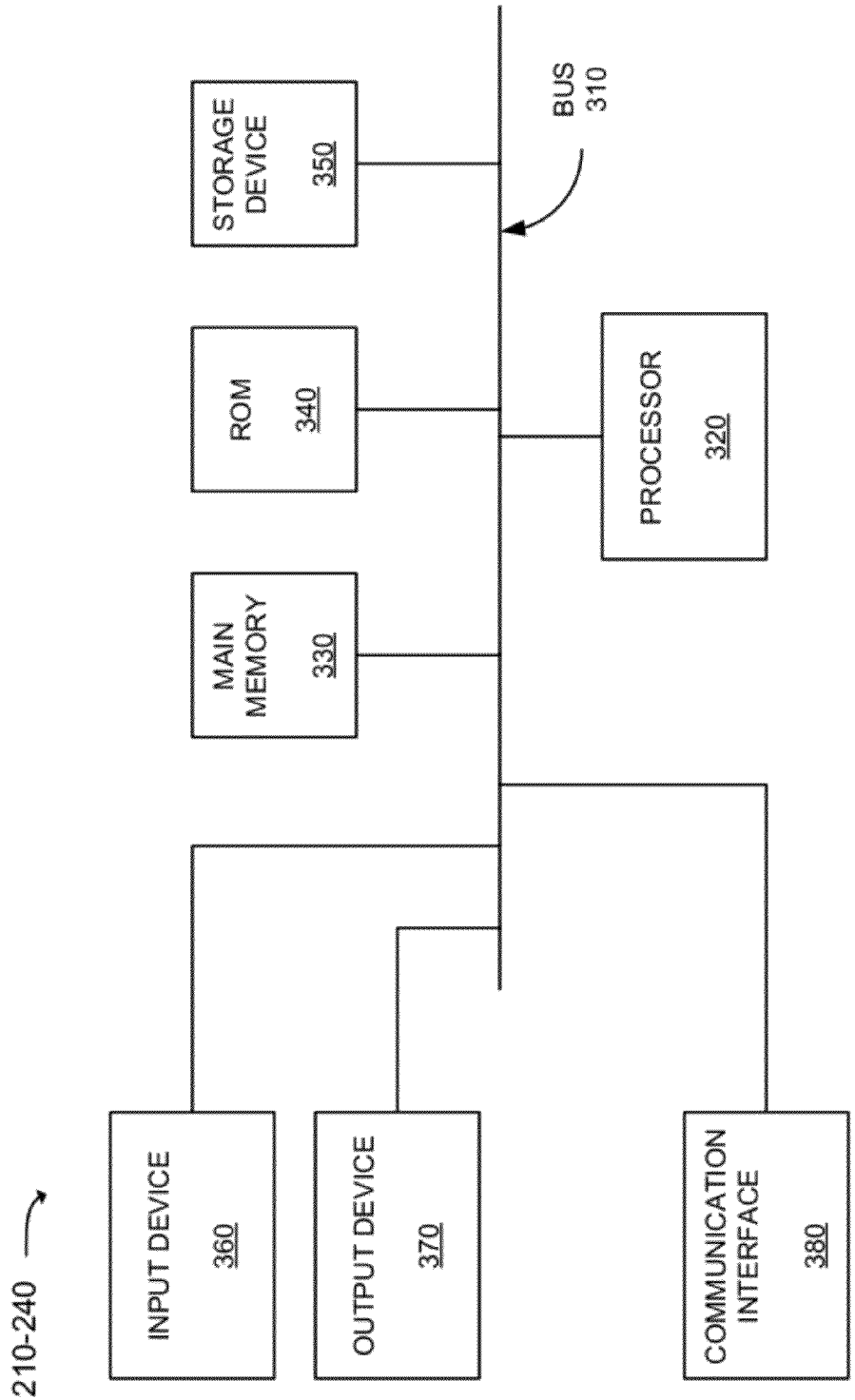
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain query processing-related operations. The client/server entity may perform these operations in response to processor 320 executing software instructions contained in a computer-readable medium, such as memory 330. A computer-readable medium may be defined as a physical or logical memory device and/or carrier wave. The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

Figure 4:
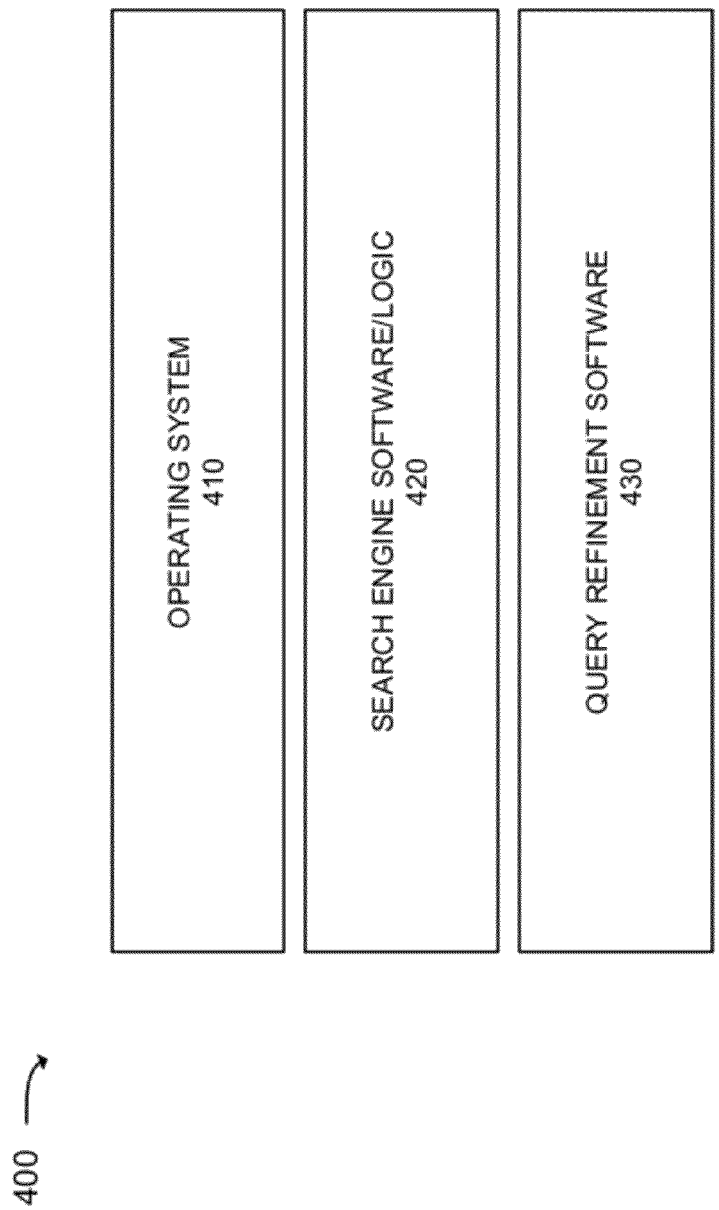
FIG. 4 is a diagram of a portion of an exemplary computer-readable medium that may be used in FIGS. 2-3.

FIG. 4 is a diagram of a portion of an exemplary computer-readable medium 400 that may be used by servers 220-240. In one implementation, computer-readable medium 400 may correspond to memory 330 of server 220. The portion of computer-readable medium 400 illustrated in FIG. 4 may include an operating system 410, search engine software/logic 420, and query refinement software 430.

Operating system 410 may include operating system software, such as the Windows, Unix, or Linux operating systems. Search engine software/logic 420 may provide a mechanism for receiving query information from one or more clients 210 and identifying relevant search results based on the received query. Query refinement software 430 may include software that identifies query refinements based on a received query in accordance with the principles of the invention set forth in detail below. In one implementation consistent with principles of the invention, query refinement software 430 may be integrated into search engine software/logic 420.

Exemplary Processing for Identifying Synonyms

Figure 5:
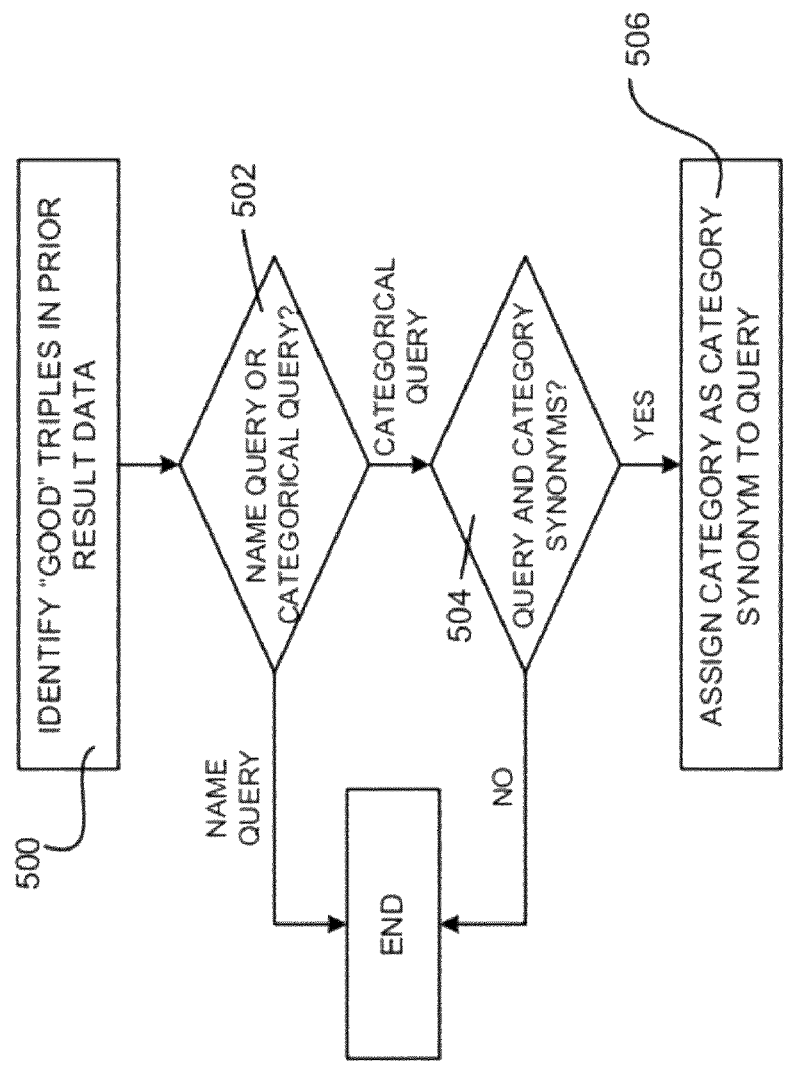
FIG. 5 is a flow chart of an exemplary process for identifying synonyms in an implementation consistent with the principles of the invention.

FIG. 5 is a flow chart of an exemplary process for identifying synonyms in an implementation consistent with the principles of the invention. As briefly described above, received user search queries may include numerous terms or phrases, portions of which may have numerous synonyms that may apply depending upon the overall context of the query. For example, in one implementation consistent with principles of the invention, the received search query may relate to a search for localized business or merchant information. Typically, search queries of this form include a name and/or category information. Further, such search queries may further include some form of location information, such as a predefined location associated with a user, a geographical region bounded by a displayed map, or location information included within the received search query itself. Although local search information is primarily described here, in additional implementations, other tagged or categorized "documents" or information may be searched in a similar manner. For example, product information or pricing searches may result in retrieval or identification of products based on predefined product categories, One recognized issue with performing local searching is that the searchable information is typically listed and stored based on name, location, and category. In many instances, such information is provided by a listing source, such as a local yellow pages or business listing directory. Because the listing information may include information (e.g., category information) not otherwise gleaned from the business name, enhanced searching may be performed. Unfortunately, assigned category information may be limited to one particular term or phrase or even several particular terms or phrases. For example, all eateries may be listed under a "restaurants" category, while a search query may include the term "diner". Using the pure syntax of the search query to perform the associated search would fail to recognize that in some instances, "restaurant" is a suitable synonym for "diner". Accordingly, the associated search would not include the restaurant category in performing the search and instead would search for "diner" exclusively.

In accordance with principles of the invention, received search queries may be refined by query refinement software 430 to include enhanced or additional categories based on prior search query/result combinations. Turning to FIG. 5, processing may begin by identifying "good" or relevant "triples" from logs of historical searches and results (act 500). As used herein the term "triple" may be defined generally to include data representative of prior query results. More particularly, a "triple" may include: 1.) the query terms; 2.) a result business name; and 3.) a result business category. Further, a determination regarding whether an identified "triple" is "good" or not may be based on any suitable factors.

In one implementation consistent with principles of the invention, "good" triples are identified as those triples upon which a predefined action was received. For example, in one exemplary embodiment, in addition to supplying the information containing the business listing to client 210, servers 220-240 may also provide additional information or functionality relating to each listing, such as driving directions, email links, links to a website associated with the listing, etc. In such an implementation, a good triple may be identified as a triple associated with a listing relating to which a client 210 transmitted a predefined user action to server 220-240. In one specific embodiment, the user action may be clicking on a link for driving directions.

It should be noted that many stored listings may have multiple business names and multiple categories associated therewith. Accordingly, a driving direction click (or other "goodness" indication) may give rise to multiple query-name-category triples. For example, a received query of 'bar' may match a particular listing 'Joe's Bar and Grill' with two categories: 'bars' and 'taverns'. In this example, two individual query-name-category triples may be observed: 1.) (bar, 'Joe's Bar and Grill, bars), and 2.) (bar, 'Joe's Bar and Grill, taverns). Given the existence of two good "triples" for the listing, the question of how to count the triples is raised. In one implementation consistent with principles of the invention, each of the above triples may be treated as having a count of 0.5 (rather than 1.0). Similarly, in an example where a query results in three identified triples, each triple may be treated as a count of 0.333. That is, the single listing weight (1.0) is distributed evenly among the multiple triples associated therewith. In this manner, the sum of the whole dataset correctly adds up to the observed results.

Once good triples have been identified, queries associated with the good triples may be classified as "name queries" or "categorical queries" (act 502). As defined herein, "name queries" include query terms relating to a business name (e.g., "China Taste Buffet") and "categorical queries" include query terms relating to a potential business category (e.g., "Chinese restaurant"). By distinguishing between the two types of queries, identified categories are prevented from being assigned as synonyms to name queries.

In accordance with one implementation consistent with principles of the invention, the name query/categorical query determination may be made based upon a degree of "name entropy" or "name perplexity" associated with each identified query. Toward this goal, each query's name name perplexity may be represented by the following expression:

$$e^{H(name|query)},$$

where H(name|query) is the conditional name entropy of the business name, given a query estimated from the results selected in act 500. Name entropy may be defined by the following expression:

$$-\sum_{\substack{all \\ names}} P(name \mid query) \log P(name \mid query)$$

where P(name|query) is the probability of the name begin returned given the query.

In other words, the likelihood that a query includes a business name may be determined based on the number of business names that pair with the query. Those queries to which few business names pair are considered categorical queries (e.g., low name perplexity), while those queries to which more different names pair with the query are considered to have high name perplexity. It should be understood that the concept of entropy is introduced to account for weighting between frequently used and infrequently used names.

Once it is determined that an identified query is both a good query and a categorical query in acts 500 and 502, respectively, it is then determined whether the result category and the identified query should be treated as synonyms (act 504). For example, a category "Restaurants-Chinese" may be determined to be a category synonym for the query "Chinese restaurant", based upon an initial "goodness" determination for the query-result_name-result_category listing in act 500 and a high name perplexity (that is, many business names may be paired with this query) identified in act 502. If such a determination is made, the identified category may be assigned as a category synonym for the associated query terms (act 504), thereby ensuring that subsequent searches associated with the query will additionally invoke searches relating to the category.

Unfortunately, simply examining queries forwarded through acts 500 and 502 does not account for the possibility of query/category hyponyms. As is known, a hyponym is a word whose meaning a denotes a subordinate or subclass. For example, Pennsylvanian is a hyponym for American. Returning to the problem at hand, an observed query, "Chinese restaurant", may be a hyponym for category "Restaurants", since a Chinese restaurant is a sub-category of the category "Restaurants". Because the latter query, category pair involves a containment rather than an equivalence (e.g., a Chinese restaurant is a type of restaurant, but is not equivalent to "restaurant"), it should not be used as a synonym for the category "Restaurant".

Figure 6:
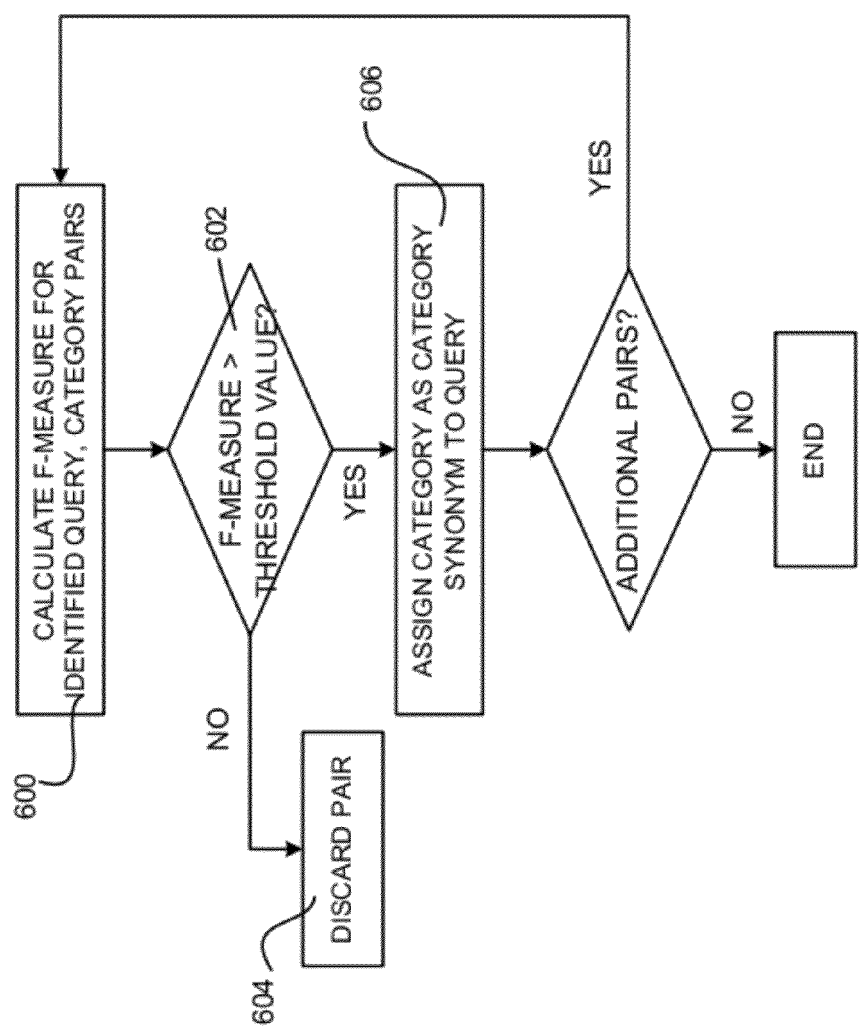
FIG. 6 is a flow chart of exemplary processing for distinguishing between containment and equivalency query, category pairs in one implementation consistent with principles of the invention.

FIG. 6 is a flow chart of exemplary processing for distinguishing between containment and equivalence query, category pairs. To facilitate rejection of containment type query, category pairs, an F-measure for an identified query, category pair is calculated (act 600). As defined herein, each pair's F-measure may be defined as the likelihood that a query, category pair is a hyponym or containment type pair, that should be rejected as a synonym. Such a calculation may be represented by the following expression:

$$F\text{-measure(query, category)} = \frac{P(\text{query, category})}{(a \times P(\text{category}) + (1-a) \times P(\text{query}))}$$

In the above expression, P(query, category) represents the joint probability of both category and query being synonyms for each other. The value for P(query, category) and P(category, query) may be estimated by a count of the number of instances that the category and the query terms are seen together and evidenced as "good" by association with a desirable user action (e.g., selection of driving directions link) divided by a count of the number of instances that the desirable user actions received.

A value for P(query) may be estimated by a count of the number of instances that the query terms resulted in performance of the desirable user action divided by a count of the number of instances that the desirable user actions was received. Similarly, a value for P(category) may be estimated by a count of the number of instances that the identified category resulted in performance of the desirable user action divided by a count of the number of instances that the desirable user actions was received.

Additionally, P(query|category), may be defined as the probability of the query given the category and P(category|query), which is the probability of the category given the query. They are defined as P(query|category)=P(query, category)/P(category) and P(category|query)=P (query, category)/P(query) and are estimated using the earlier estimates of the components. In general statistical terms:

$$F\text{-measure} = \frac{1}{\left(a \times \left(\frac{1}{\text{recall}}\right) \times (1-a) \times \left(\frac{1}{\text{precision}}\right)\right)}$$

However, in the context of query and category probabilities, the recall is P(category|query), precision is P(query|category) and F-measure equals P(query,category)/(a*P(category)+(1−a)*P(query)), which follows by plugging the above definitions into the general F-measure formula and simplifying. The terms 'recall' and 'precision' in this context are with respect to the following retrieval experiment: for a given query and category, return as a response to the query, all results that match that category.

A suitable tradeoff between precision and recall may be established through the selection of a value for the constant 'a'. It has been determined that a value in the range of approximately 0.7 to 0.9 provides a suitable compromise between precision to recall to accurately eliminate or reduce the likelihood that hyponyms are included within identified category synonyms. In one exemplary implementation, the value for 'a' is 0.85.

Once the F-measure for the selected query, category pair has been determined, it is then determined whether the calculated F-measure satisfies predefined criteria (act 602). If so, the query and category in the query, category pair are considered to be synonyms (act 604). If not, the query and category are not considered synonyms and the pair is discarded from consideration (act 606).

In one exemplary implementation, the F-measure criteria may include any suitable manner for determining those query, category pairs having higher or greater F-measure values for a given query. For example, it may be determined that only the query, category pair having the highest F-measure are to be considered synonyms for each other for the given query. Alternatively, a predefined top number of query, category pairs may be considered synonyms for the given query. In still another implementation, a maximum F-measure value may be determined, and all query, category pairs up to a predetermined percentage (e.g., 50%) of this value may be considered synonyms for the given query. In yet another implementation, a minimum required F-measure value may be determined, and those query, category pairs meeting or exceeding this value may be identified as synonyms for the given query.

In another exemplary implementation, F-measure value may be combined with other factors, such as name perplexity, category perplexity, and query frequency. For example, in order to be considered synonyms, a query, category pair may be required to have a name perplexity of at least 25, have a category perplexity of at least 50, a query frequency of at least 1/1,000,000, and must have an F-measure value greater than both 0.03 and 50% of the maximum measured F-measure value.

Following synonym determination, it is then determined whether additional query, category pairs remain to be processed (act 608). If so, the process returns to act 600 for the next query, category pair. If no additional query, category pairs remain to be processed, the process stops.

In one implementation consistent with principles of the invention, synonym pairs may be passed onto one or more "labellers" for subsequent manual review of the inferred synonyms. In this manner, potentially inaccurate synonyms that otherwise pass the various tests set forth above may be vetted prior to inclusion in performing actual user searches.

FIG. 7 is a flow chart illustrating exemplary processing for performing a user initiated search in accordance with principles of the invention. Initially, a search query is received from client 210 at the direction of a user (act 700). As described above, in accordance with principles of the invention, the search query may, in one exemplary implementation, include numerous terms relating to locating or identifying local business information. In alternative implementations, the search query may be directed toward the location or identification of additional types of information, such as product pricing and description information, textual web-based information, media (e.g., songs, images, videos, etc.) information.

Regardless of the type of information being requested, search engine 225 on server 220 may next identify one or more categories associated with the requested information (act 702). The manner in which an initial category is identified is outside the scope of the present invention and will be described in detail herein. However, once an initial category has been identified, category synonyms determined using the process of FIGS. 5 and 6 may then be identified (act 704). Using the query terms, the initially determined category or categories, and the category synonyms identified in the manner detailed above, search results may then be generated (act 706) and forwarded to client 210 for eventual display to the requesting user.

In one exemplary implementation, the listing information may be specifically searched using category synonyms identified in the manner described above in addition to the received query terms. For example, a search for 'doctors' may be revised to include an identified category synonym of "Physicians-General Practice". In one implementation, such terms may be logically OR'ed. In the given example, the resulting query would include "doctors OR EXACTCATEGORYMATCH (Physicians-General Practice), where EXACTCATEGORYMATCH ensures that each term included within the defined category synonym is found within the categories identified in the listing information. In this manner, confusion caused by partial category matches (e.g., PHYSICIAN-Obstetrician) with the associated listings are avoided.

By using historical search information to infer category synonyms, enhanced search results may be provided. More particularly, by identifying good search results from prior searches, category synonyms may be accurately inferred. Using the inferred synonyms in providing future search results increases the likelihood of providing desirable results to users.

CONCLUSION

Systems and methods consistent with principles of the invention may facilitate search query refinement. In one implementation consistent with principles of the invention, category synonyms may be inferred from historical search information.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 5-7, the order of the acts may be modified in other implementations consistent with principles of the invention. Also, non-dependent acts may be performed in parallel. Further, the acts may be modified in other ways.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. A method performed by one or more server devices, the method comprising:
   identifying, using one or more processors associated with the one or more server devices, a particular search result of a plurality of previously selected search results, where the particular search result is associated with a query and a category,
   where the query includes one or more query terms;
   determining, using one or more processors associated with the one or more server devices, that the one or more query terms and the category are synonyms, where the determining comprises:
      determining, using one or more processors associated with the one or more server devices, whether the one or more query terms are hyponyms of the category, and
      determining, using one or more processors associated with the one or more server devices, that the one or more query terms and the category are synonyms when the one or more query terms are not hyponyms of the category;
   receiving another search query associated with the category; and
   modifying, using one or more processors associated with the one or more server devices, the other search query to generate a modified search query that includes the one or more query terms when the one or more query terms and the category are synonyms.

2. The method of claim 1, further comprising:
   determining whether the query, associated with the particular search result is a name query or a category query,
   where the name query is associated with a business name, and
   where the category is associated with a business category.

3. The method of claim 2, where the query is not assigned as a synonym to the category when the query is determined to be a name query.

4. The method of claim 2, where determining whether the query is a name query or a category query further comprises:
   determining, for the query, a name perplexity value.

5. The method of claim 4, where determining the name perplexity value further comprises:
   determining a number of business names associated with the query.

6. The method of claim 5, further comprising:
   identifying the query as a name query when the number of business names associated with the query is below a threshold.

7. The method of claim 5, further comprising:
   identifying the query as a category query when the number of business names associated with the query is above a threshold.

8. The method of claim 1, where determining whether the one or more query terms are hyponyms of the category further comprises:
   determining an F-measure value for the one or more query terms and the category.

9. The method of claim 8, further comprising:
   determining that the one or more query terms are hyponyms of the category when the F-measure value is less than a threshold value.

10. The method of claim 8, further comprising:
    determining that the one or more query terms are not hyponyms of the category when the F-measure value is greater than a threshold value.

11. A server comprising:
    a memory to store instructions; and
    a processor to execute the instructions to:
       identify a particular search result of a plurality of previously selected search results, where the particular search result is associated with a query and a category,
       determine that the query and the category are synonyms,
       where, when determining whether the query and the category are synonyms, the processor is to:
          determine whether the query is a hyponym of the category, and
          determine that the query and the category are synonyms when the query is not a hyponym of the category,
       receive another search query that is associated with the category, and
       modify the other search query to generate a modified search query that includes one or more terms that are included in the query when the query and the category are synonyms.

12. The server of claim 11, where, when determining whether the query is a hyponym of the category, the processor is further to:
    determine an F-measure value for the query and the category.

13. The server of claim 12, where the F-measure for the query and the category is calculated in accordance with the expression:

$$F-\text{measure}(\text{query}, \text{category}) = \frac{p(\text{query}, \text{category})}{(a \times P(\text{category}) + (1-a) \times P(\text{query}))},$$

where P(n) denotes a probability of occurrence of the query, and 'a' is a particular variable for balancing recall and precision.

14. The server of claim 12, where the processor is further to:
    determine that the query is a synonym of the category when the F-measure value for the query and the category is higher than another F-measure value for the query and another category.

15. The server of claim 12, where the processor is further to:
  determine that the query is a synonym of the category when the F-measure value for the query and the category is one of a particular quantity of a set of highest F-measure values of a plurality of F-measure values for the query and a plurality of categories.

16. The server of claim 12, where the processor is further to:
  determine that the query is a hyponym of the category based on a combination of the F-measure value and another factor.

17. The server of claim 16, where the other factor comprises:
  a name perplexity value, a category perplexity value, or a query frequency value.

18. A computer-readable memory device including instructions executable by at least one processor, the computer-readable memory device comprising:
  one or more instructions to identify a particular search result of one of a plurality of previously selected search results, where the particular search result is associated with a query and a category;
  one or more instructions to determine that the query and the category are synonyms, where the one or more instructions to determine comprise:
    one or more instructions to determine whether the query is a hyponym of the category, and
    one or more instructions to determine that the query and the category are synonyms when the query is not a hyponym of the category;
  one or more instructions to receive another search query; and
  one or more instructions to modify the other search query to generate a modified search query that includes one or more terms that are included in the query when the query and the category are synonyms.

19. The computer-readable memory device of claim 18, further comprising:
  one or more instructions to determine whether the query, associated with the particular search result is a name query or a category query,
  where the name query is associated with a business name, and
  where the category is associated with a business category.

20. The computer-readable memory device of claim 19, where the query is not assigned as a synonym to the category when the query is determined to be a name query.

21. The computer-readable memory device of claim 19, where the one or more instructions to determine whether the query, associated with the particular search result is a name query or a category query comprise:
  one or more instructions to determine, for the query, a name perplexity value,
  where the query corresponds to a category query when the determined name perplexity value is above a threshold, and
  where the query corresponds to a name query when the determined name perplexity value is below the threshold.

22. The computer-readable memory device of claim 18, where the one or more instructions to determine whether the query is a hyponym of the category comprise:
  one or more instructions to determine an F-measure value for the query and the category,
  where the F-measure for the query and the category is calculated based on:

$$F - \text{measure(query, category)} = \frac{p(\text{query, category})}{(a \times P(\text{category}) + (1-a) \times P(\text{query}))},$$

where P(n) denotes a probability of occurrence of the query, and a corresponds to a particular variable for balancing recall and precision.

23. The computer-readable memory device of claim 18, further comprising:
  one or more instructions to discard the query and the category, from further consideration, when the query is a hyponym of the category.

24. The server of claim 11, where the processor is further to:
  submit the modified search query to a search engine to obtain search results.

* * * * *

UNITED STATES PATENT AND TRADEMARK OFFICE
CERTIFICATE OF CORRECTION

PATENT NO. : 8,156,102 B2
APPLICATION NO. : 12/581544
DATED : April 10, 2012
INVENTOR(S) : Michael D. Riley et al.

It is certified that error appears in the above-identified patent and that said Letters Patent is hereby corrected as shown below:

Claim 2, column 11, line 56 should read: "particular search result, is a name query or a category query"
Claim 19, column 13, line 41 should read: "associated with the particular search result, is a name"
Claim 21, column 14, line 7 should read: "query, associated with the particular search result, is a name"

Signed and Sealed this
Twenty-eighth Day of August, 2012

David J. Kappos
*Director of the United States Patent and Trademark Office*